April 1, 1924.
J. E. PLUMSTEAD
1,488,829
PROCESS OF MAKING COOKING LIQUORS
Filed April 18, 1923
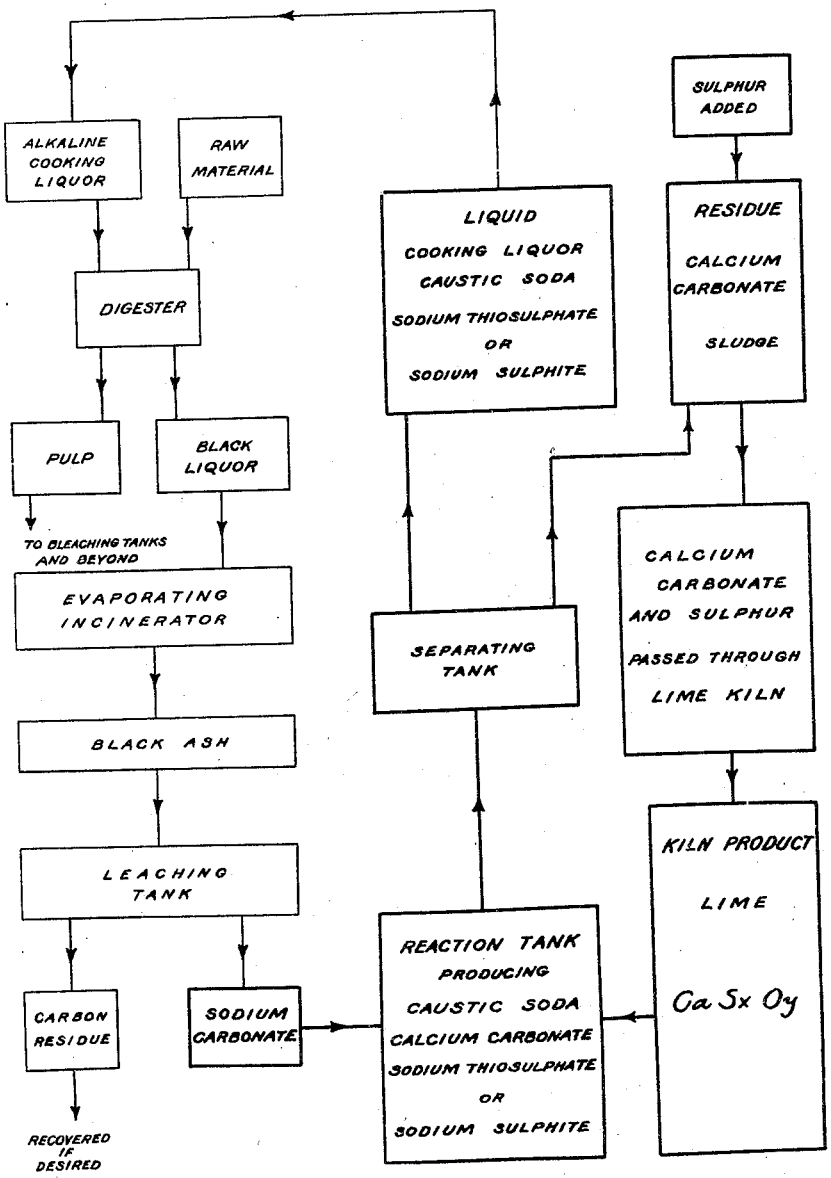
Inventor:
Joseph E. Plumstead,
by Spear, Middleton, Donaldson & Hall
Attys.

Patented Apr. 1, 1924.

1,488,829

UNITED STATES PATENT OFFICE.

JOSEPH E. PLUMSTEAD, OF WILMINGTON, DELAWARE, ASSIGNOR TO THE JESSUP & MOORE PAPER CO., OF PHILADELPHIA, PENNSYLVANIA, A CORPORATION OF MASSACHUSETTS.

PROCESS OF MAKING COOKING LIQUORS.

Application filed April 18, 1923. Serial No. 632,927.

*To all whom it may concern:*

Be it known that I, JOSEPH E. PLUMSTEAD, a citizen of the United States, and a resident of Wilmington, in the county of New Castle and State of Delaware, have invented certain new and useful Improvements in Processes of Making Cooking Liquors, of which the following is a specification.

My present invention relates to a process of preparing an alkaline cooking liquor for the production of chemical pulp.

The primary object of this invention is the introduction of sulphur into this liquor in such form that its maximum digestive qualities are made use of with the minimum amount of loss through depreciation or otherwise.

A further object of the invention is the introduction of the required amount of sulphur at a point in the cycle of operations where the heat value of the combustion thereof may be utilized to serve a useful purpose and which will require neither special burners therefor, nor cooling or contact towers or vessels for the resulting gases.

At the present time I find it expedient, in carrying out the soda process of digestion, to recover the soda from the black liquor by incineration of the latter in the usual manner. Ordinarily the black ash is leached with water, the carbon filtered off and the $Na_2CO_3$ causticized with lime with the formation of $CaCO_3$ and $NaOH$, the latter being returned, with or without additions, to the digestors to treat a new batch of raw material. I am aware that it has been proposed to introduce sulphur into the $NaOH$ before returning this liquor to the digestors, but such a process is not desirable because of the formation of compounds readily decomposed in the digestors into compounds which produce gases having a most disagreeable odor, and moreover, the formation of such gases causes a material loss of sulphur, which must be replaced as the cycle is repeated.

I have found, however, that if sulphur be added to the $CaCO_3$ sludge and the mixture calcined, as in a kiln or the like, the sulphur will eventually reach the cooking liquor in desirable form. Thus when this calcined mixture is caused to react with the $Na_2CO_3$ leached from the black ash, there is formed a more or less stable sulphur compound, in addition to the production of $NaOH$ because of free lime present in the product from the kiln. This more or less stable sulphur salt I suspect to be $Na_2S_2O_3$ and may then be separated from the insoluble $CaCO_3$, the solution also containing $NaOH$, as above mentioned. This liquid may then be used, with or without additions, as the digesting liquor. These steps may be readily followed by reference to the accompanying diagram.

I have reason to believe that $CaS_xO_y$ is formed by the simultaneous combustion of sulphur and the calcination of the $CaCO_3$, although other salts may be formed at this point. This $CaS_xO_y$ is converted in the causticizing step into the corresponding sodium salt, with the result that the cooking liquor is composed mainly of $NaOH$ and $Na_2S_2O_3$. This cooking liquor has, by analysis, been found to contain sodium hydroxide and sodium thiosulphate. It is recognized that many of the $CaS_xO_y$ salts which might be formed in the calcination step are unstable and readily decomposed, and for this reason there is some doubt as to their actual formation. However, the conclusion that they are formed is based upon the presence of sodium thiosulphate in the cooking liquor, which has been actually proven by chemical analysis. Other salts of sodium and sulphur may be present in the cooking liquor, but I believe it is the presence of the $Na_2S_2O_3$ which causes the most efficient digestion of the raw material when thus treated. I have also found that a remarkably small quantity of sulphur need be added to the cycle when it again reaches this point, demonstrating that this combination of sodium and sulphur is suitable to digestion conditions, where the sulphur salts heretofore used were not. I have also found that $Na_2SO_3$ may be used in alkaline digesting liquor with beneficial results.

It may be found that the sulphur may be added at other points in the cycle with equally satisfactory results, as this is a matter of experimentation. However, this invention contemplates the use of $Na_2SO_3$ and $Na_2S_2O_3$, or perhaps other combinations of sodium and sulphur in a three element compound in an alkaline cooking liquor, regardless of its method of introduction or formation.

It will be readily apparent that by the introduction of the sulphur to the cold end of the lime recovery system, the heat value of the sulphur combustion is utilized to its fullest extent. Obviously less external heat is necessary to completely remove the water and $CO_2$ from the $CaCO_3$ with this combustible material intimately mixed therewith than otherwise.

The exact amount of sulphur to be added is not constant, as this will depend upon the amount of $CaCO_3$ to be calcined, the amount of free lime desired in the kiln product, the character of the liquor desired, as well as the character of the material being treated. However, the control of sulphur secured by this method is most accurate, as the sulphur deficiency of the cycle may be determined at any one of several points by chemical analysis, and due to the stable character of the compound carrying the sulphur, losses are cut to a minimum.

It may be found desirable to utilize salts of other metals of the alkali group in the cooking liquid and likewise other salts of the alkaline earth metals may be used in the place of calcium when this is found expedient, although the particular metals mentioned form salts which are desirable because of cheapness.

I claim:

1. A process of preparing cooking liquor for the preparation of chemical pulp which includes the steps of causing sodium carbonate to react with a calcium salt containing sulphur and separating the insoluble matter therefrom.

2. A process of preparing cooking liquor for the preparation of chemical pulp which includes the steps of causing sodium carbonate to react with $CaS_xO_y$ and separating the insoluble matter therefrom.

3. A process of preparing cooking liquor for the preparation of chemical pulp which includes the steps of reacting $Na_2CO_3$ with $Ca(OH)_2$, separating out the resulting $CaCO_3$, adding sulphur thereto, burning said mixture, reacting the resulting mass with $Na_2CO_3$, and separating the filtrate from the residue.

4. A process of preparing cooking liquor for the preparation of chemical pulp which includes the steps of causticizing $Na_2CO_3$, and calcining the resulting insoluble residue with sulphur.

5. A process of introducing sulphur into cooking liquor for the preparation of chemical pulp which includes the step of burning sulphur and calcining calcium carbonate simultaneously while in contact with each other.

6. A process of preparing cooking liquor for the preparation of chemical pulp which includes the step of calcining calcium carbonate with sulphur, whereby the heat of combustion of the sulphur is utilized within the kiln to assist in the calcination of the calcium carbonate.

7. A process of introducing sulphur into cooking liquor for the preparation of chemical pulp, which includes the steps of burning sulphur and calcining calcium carbonate, and bringing the end products of these reactions together.

In testimony whereof, I affix my signature.

JOSEPH E. PLUMSTEAD.